Patented Apr. 2, 1935

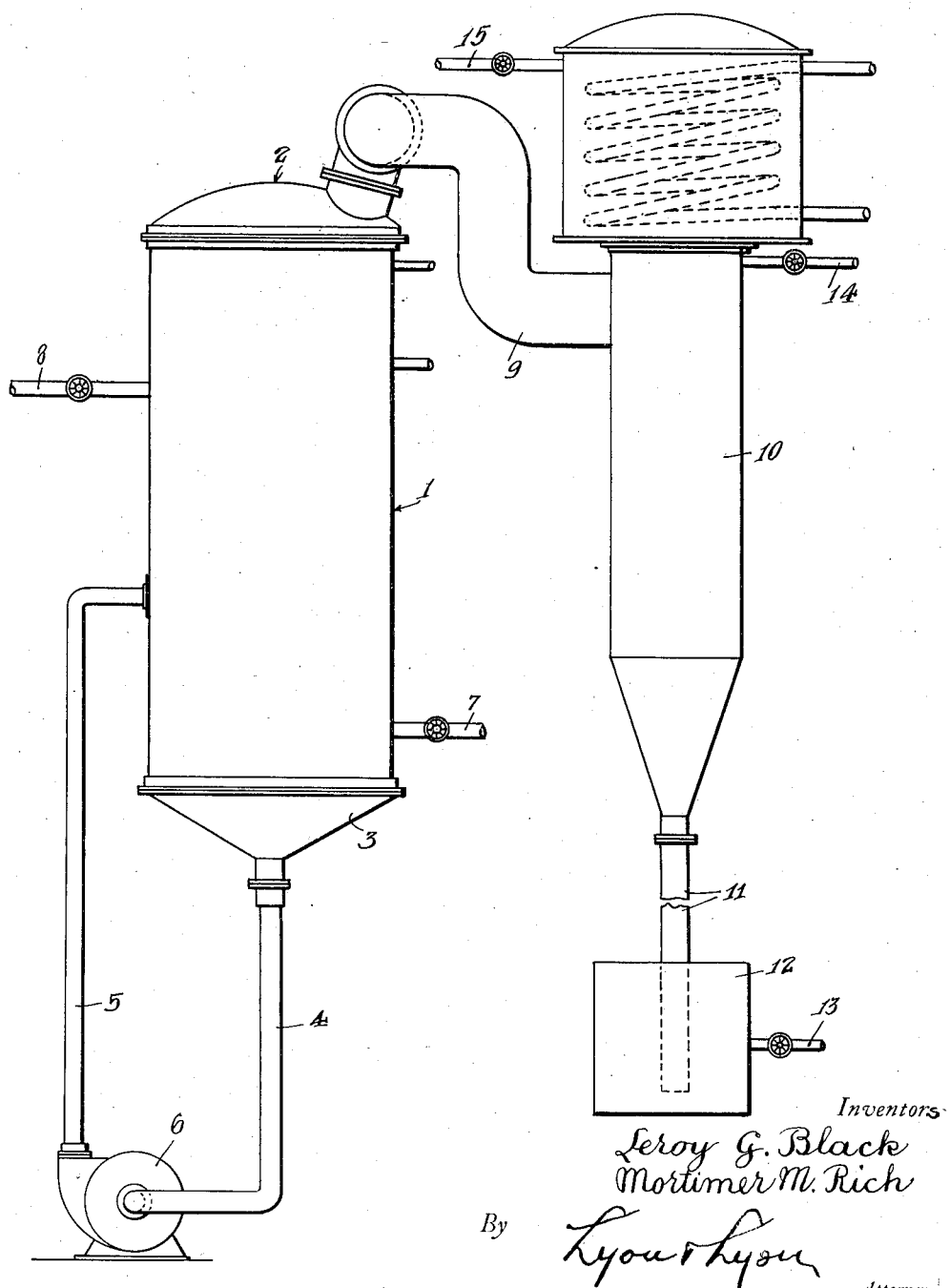

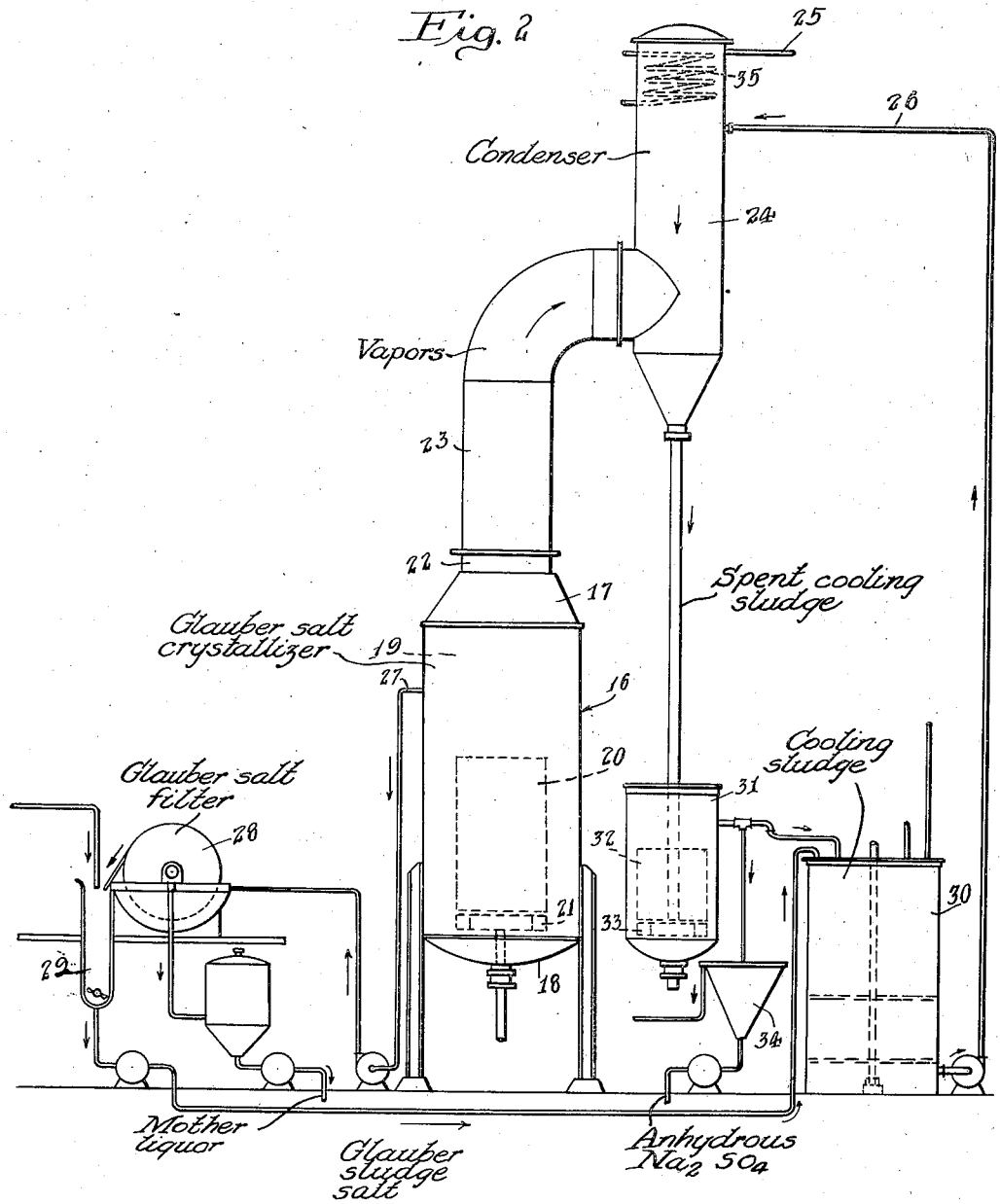

1,996,053

UNITED STATES PATENT OFFICE 1,996,053

PROCESS OF COOLING

Leroy G. Black and Mortimer M. Rich, Trona, Calif., assignors to American Potash & Chemical Corporation, Trona, Calif., a corporation of Delaware Application October 21, 1932, Serial No. 638,932

29 Claims. (Cl. 23—1)

This invention relates to the art of cooling and includes improvements applicable to both cooling processes in which there is an indirect transfer of heat, such as through heat exchangers and processes in which the transfer of heat is direct as in barometric or jet condensers; it also includes features which are of particular value in evaporative cooling operations where the cooling medium is brought into either direct or indirect contact with the vapors evaporated in the cooling operation.

The invention also includes features relating to the production of a salt having a low degree of hydration from a higher hydrated form of said salt and particularly to the production of anhydrous sodium sulphate from Glauber salt.

Generally speaking, the present invention has for its object to provide a process in which either a lower cooling temperature may be obtained than can be economically obtained by other means, or to provide a process in which the temperature of cooling may be maintained more readily constant, or in some cases where both results are desired.

Another object of the invention is to provide a process of crystallizing Glauber salt from a solution of sodium sulphate while simultaneously converting Glauber salt to anhydrous sodium sulphate and recovering the refrigeration required for the crystallization of Glauber salt.

The present invention includes primarily the discovery that if in a process of cooling materials a cooling medium is used consisting of certain sludges of solid materials and solutions thereof both the temperature of cooling may be brought more readily to a desired point and this temperature may be maintained more easily constant than with cooling processes heretofore known, more particularly, if a sludge is employed as a cooling medium which contains such components and phases as to have, according to the phase rule, no degrees of freedom. It may be employed as a cooling medium either in an indirect or direct manner without varying in temperature during the cooling operations. There are various sludges of this class which may be used. Such a sludge should preferably be one which possesses the following characteristics:

First, that the solution of the solid material in the sludge or the solution of such material together with the conversion thereof to and the precipitation of another form of said material is an endothermic change, so that the sludge may absorb heat from the medium to be cooled without deviating from its transition temperature;

Second, that there be sufficient of the solid materials present so as to retain all solid phases present after the absorption of the desired amount of heat and that the system be one having no degrees of freedom, and in addition thereto where the cooling medium is employed in direct contact with vapors and the materials being cooled, the cooling medium contains sufficient of such solid materials to saturate the new solvent condensed.

A preferred example of such a sludge suitable in our process of cooling is one consisting of a saturated solution of salts in equilibrium with two salts of different degrees of hydration; one of the degrees of hydration may be zero, as in the case of anhydrous salt, or both of the degrees of hydration may represent hydrated salts, one having a higher degree of hydration than the other. For example, a solution of sodium sulphate at the temperature of transition between the decahydrate ($Na_2SO_4.10H_2O$) to sodium sulphate anhydrous ($Na_2SO_4$), containing an excess of both solids is a sludge system possessing no degrees of freedom. This sludge may absorb heat when brought into direct or indirect contact with the material to be cooled without varying in temperature because the heat absorbed is consumed in effecting a transition of the more hydrated salt to the less hydrated salt.

A further advantage of the use of such cooling mediums in the present invention resides in the fact that the temperature at which they exist and at which they maintain themselves in the cooling operation is in many cases lower than the temperature at which cooling water itself may be obtained in many regions. Thus, for example, the transition temperature of the particular sludge described is 32.38° C. Other cooling sludges having no degrees of freedom may readily be formed, which possess even lower transition temperatures. As a simple example thereof, by adding common salt to such a sludge the transition temperature of the sludge may be depressed to 17.9° C.

The process of the present invention has, therefore, special advantages in its ability to maintain lower cooling temperatures when employed in desert regions. In desert regions the conditions prevalent, particularly in summer months, are such that spray pond water can not be obtained at temperatures below about 25 to 30° C.

A further feature of the present invention involves the application of the principles of a constant temperature cooling sludge to the recovery of a salt of low degree of hydration from a higher hydrated form of said salt. In particular, the invention is applicable to the recovery of any salt in a form having a low degree of hydration from which the transition from a higher hydrate to a lower hydrate is endothermic. Briefly, the recovery is accomplished by first crystallizing out the higher hydrate, forming a sludge on said hydrate with a substance capable of depressing the transition point between said higher hydrate and the desired lower hydrate and employing such sludge as a cooling medium to cause crystallization of further higher hydrate, the heat absorbed by the cooling medium sludge causing the conversion of the higher hydrate to the lower hydrate.

The present invention, together with various other objects and advantages thereof, particularly certain advantages discovered in connection with one particular application of the invention, will best be understood from a description of particular forms or examples of processes embodying the invention. For this purpose, we have hereinafter described in detail preferred forms of our process. The description is given with reference to the accompanying drawings, in which Figure 1 represents an elevation of an apparatus adapted for carrying out one form of the process embodying the invention; and Figure 2 is an elevation showing an apparatus adapted for use in a second form of the process embodying this invention.

Referring, first, to Fig. 1 of the drawings, the apparatus there illustrated comprises an evaporator 1 of any suitable form, having top and bottom closures 2 and 3. Preferably, there is provided a suitable means for agitating the contents of the evaporator, such as the circulation system comprising the circulating lines 4 and 5 and pump 6. There is also provided a valved inlet line 7 for the material to be cooled and a valved outlet line 8, in case it is desired to operate the process and apparatus continuously. Leading from the top of the evaporator 1 is a vapor line 9 which leads to a barometric condenser 10, which is provided with the usual tail pipe 11 leading to hot well 12, from which admixed condensate and cooling medium may be withdrawn, if desired, through line 13. The hot well serves as a seal for the barometric condenser 10. A valved inlet line 14 is provided at the upper end of the barometric condenser 10 for introducing the cooling medium, and the barometric condenser is also preferably provided with a line 15 leading to a suitable means for removing noncondensible gases.

In the operation of the process and apparatus, the solution to be cooled may be continuously introduced into evaporator 1 by line 7 and continuously removed therefrom through line 8. In operation, it is preferably agitated by circulation through lines 4 and 5 by pump 6. Upon the evaporator 1 there is imposed a pressure less than atmospheric so as to cool the material therein through removal of heat of vaporization and the vapors are passed through line 9 into condenser 10. In the condenser 10 the vapors are preferably brought into direct contact with the cooling medium entering the line 14 and are thus condensed and pass out admixed with the cooling medium through the tail pipe 11 into the hot well 12. In the operation of such process the temperature of cooling in the evaporator 1 is dependent upon the vapor pressure and, in turn, the temperature of the cooling agent and condensate introduced into the barometric condenser 10 through line 14.

The present invention provides a means by which this temperature may be maintained more readily constant and also lower in certain cases than has heretofore been economically possible with this type of cooling apparatus. When such a type of barometric condenser is serviced with cooling water, such as spray pond cooling water, the temperature reached in the barometric condenser is dependent upon what temperature can be secured from the spray ponds. Frequently, lower temperatures than this are desired. Moreover, when a condenser of this type is serviced with spray water, the temperature rises in the condenser due to contact with the vapors to be cooled, and depending upon the rate of supply of cooling medium and the rate of evaporation in the evaporator 1 considerable fluctuations in temperature may arise at different times. The present invention is intended to obviate both of these difficulties by using as a cooling medium introduced in the line 14 a medium which can be made and supplied at a lower temperature than spray pond water and also one which will maintain its temperature and also the vapor pressure essentially constant throughout the operations.

For the condensing medium introduced into line 14 we prefer to employ a sludge containing an excess of one or more salts, which sludge possesses no degrees of freedom. The exact materials employed in making such a sludge will, of course, vary with the different materials which can be economically obtained. Their chemical nature is immaterial, provided they are sufficiently soluble to produce the desired sludge and to produce a sludge at the desired temperature. It is preferable, however, that the salt used be one having at least two degrees of hydration. For example, we prefer to employ in the process salt solutions containing primarily sodium sulphate, since this ingredient is one of products obtained in the evaporation of Searles Lake brine. Sodium sulphate and common salt can be obtained from waste products from Searles Lake brine by the processes described in the following patents: Allen et al., Patent No. 1,873,251, issued August 23, 1932; MacDonald et al., Patent No. 1,810,181, issued June 16, 1931.

A preferred cooling medium might thus be made by dissolving sodium sulphate decahydrate in water. The heat of solution first cools the admixed sludge thus obtained, and the temperature eventually reaches the transition temperature between the decahydrate or Glauber salt and anhydrous sodium sulphate, when sufficient anhydrous sodium sulphate has been produced to cause its precipitation. Provided sufficient sodium sulphate decahydrate is employed, a saturated solution is obtained having a constant temperature of 32.38° C. after anhydrous sodium sulphate is present in the solid state. This sludge is employed as a cooling medium in the process just described. Contact of the water vapor from the evaporator 1 with the cooling solution causes the condensation of said water vapor without either modification of the temperature or pressure of the medium within the condenser 10. The heat is absorbed by the heat of transformation of the decahydrate salt to the anhydrous salt during the cooling operation and by the dissolution of solid decahydrate. As long as heat is being absorbed, sodium sulphate decahydrate is converted to anhydrous sodium sulphate. Sufficient excess decahydrate salt should be present in the sludge so as to permit such continued absorption of heat and also to saturate any condensate of vapors from the evaporator 1 with sodium sulphate. In this manner, the process of the present invention avoids any irregularities in the pressure maintained on the evaporator 1 or the temperature of cooling in evaporator 1, and the cooling process thus may be operated without special attention as to the control of rates of flow.

In case a lower temperature of cooling is desired in the evaporator 1 or the cooling medium in condenser 10 is desired to be maintained at a lower temperature, this may be accomplished by adding to the sludge a material capable of depressing the transition temperature between two forms of the salt used having different degrees of hydration. As an example of an agent which may be added to the sludge to lower the transition point of sodium sulphate decahydrate to anhydrous sodium sulphate, we have employed sodium chloride, or common salt. Sufficient common salt, in such a case, is added to the cooling solution to saturate the solution and at the same time where as here the cooling medium is employed for direct contact with the medium to be cooled an excess of sodium chloride is provided sufficient to keep the solution saturated with sodium chloride after the addition of the condensate and after the liberation of the water of hydration by conversion of the decahydrate to the anhydrous form. The transition temperature between the sodium sulphate salts is lowered by the addition of sodium chloride to 17.9° C. With the use of a sludge of this composition the process is operated just as before, differing only in that a lower vapor pressure is maintained in the evaporator 1 and consequently a lower temperature of cooling is obtained therein. In the condenser 10, with this second type of cooling medium, the temperature is maintained constant independent of the absorption of heat and condensation of vapors therein so long as both the sodium sulphate decahydrate and sodium chloride remain present as solid phases. This cooling medium containing sodium chloride, as well as the two sodium sulphate salts in the sludge, is of especial value in cooling brines in desert regions where cooling water of sufficiently low temperature is often not economically available.

As examples of other sludges which form systems with no degrees of freedom and may, therefore, be used as cooling agents in this process, may be mentioned solutions of sodium carbonate at the transition point between the decahydrate and the monohydrate, which is 32° C. Such a solution is produced by adding sodium carbonate to water.

A further example is the solution of sodium tetraborate at the transition temperature between the decahydrate and pentahydrate, which is 60° C. Such a solution could be obtained by adding borax to water. In case of any of the sludges above-named, the transition temperature of the sludge and thus the temperature of cooling in the process may be modified by adding to the system an excess of an ingredient for altering the transition temperature. Sodium chloride would be suitable in all cases, as well as certain other salts. The depression of transition point by the addition of sodium chloride is especially great in the case of these hydrates of sodium tetraborate, the transition temperature in a saturated solution of sodium chloride being about 35° C.

In case of the sludges formed from sodium sulphate and sodium carbonate, both the conversion of the higher hydrated form to the form of less hydration, and the crystallization of the less hydrated form are endothermic reactions, so that the cooling sludges formed from these materials and water have maximum heat absorbing capacities. In the case of the sludges formed from borax and water, the solution of the decahydrate is endothermic, but the crystallization of the pentahydrate is exothermic. Such a solution possesses a heat absorbing property since the heat of solution of the decahydrate is appreciably greater than the heat of crystallization of the pentahydrate and the capacity is equivalent to the difference between these two heats.

The temperature of the condensing medium will remain constant at the transition temperature only so long as both hydrates are present in the solid state. If the cooling medium is maintained in contact until one solid phase is entirely consumed, further absorption of heat will result in a rise in temperature of the cooling medium. In certain cases, it may be permissible and desirable in the process to permit in this manner a slight rise in temperature in the cooling medium. Where only one solid phase is present, the temperature of the medium will maintain constant, however, if the concentration of the two hydrates in the medium is maintained constant. Thus, if employed in an indirect cooler where there is no further dilution, certain salts which completely melt in their own water of crystallization may be used in accordance with the process of this invention as constant temperature cooling mediums. For example, by exchanging heat in an indirect cooler between a medium to be cooled and a salt which goes into solution in its own water of crystallization, a constant temperature will be maintained until the salt has entirely melted.

In the case of salts which almost, but do not quite, melt in their own water of crystallization, such as sodium sulphate decahydrate and sodium carbonate decahydrate, the temperature will remain substantially constant throughout the melting of the solid phase.

In addition to sodium chloride as a means for depressing the transition temperature of the sludge formed from sodium sulphate in water or sodium carbonate in water, various other agents may be employed. For example, sodium hydroxide depresses the transition point between the two hydrates of sodium carbonate as follows:

| % NaOH in solution | Transition point |
|---|---|
| 0.0 | 35.37° C. |
| 0.6 | 35.0° C. |
| 7.9 | 30.0° C. |
| 12.7 | 25.0° C. |
| 19.4 | 15.0° C. |
| 22.3 | 0.0° C. |

If such a medium is employed for reducing the transition temperature, the temperature of cooling in the process of Fig. 1, where the vapors from the evaporator are condensed in the cooling medium, would vary slightly in operation due to the fact that the sodium hydroxide concentration would be undergoing dilution. Such variation, however, would be at times desirable or might be avoided by adding sufficient sodium hydroxide to the condensing medium to maintain its concentration constant.

In some chemical processes a hydrated salt is obtained at one stage of the process, while a less hydrated salt or anhydrous form of the salt is desired at a later period in the process.

In such cases, it is the common practice to effect the dissolution of the higher hydrate and subsequently crystallize out the desired form. Processes of this nature are doubly wasteful in that refrigeration is required to effect the primary crystallization and that heat is added to re-dissolve the crystallized salt. The process of this invention enables these difficulties to be overcome in a novel manner.

In order to illustrate this, the process of this invention will be described as it is applied to the recovery of sodium sulphate from sodium carbonate complexes in accordance with the process described in the patent to Allen et al., No. 1,836,426. In the process described in that patent Glauber salt is crystallized by digesting a mixture containing hydrated sodium carbonate and a double salt of sodium carbonate and sodium sulphate with water at a temperature below approximately 25° C. This Glauber salt is then re-dissolved, as by steam, and evaporated to cause crystallization of anhydrous sodium sulphate.

By applying the principles of this invention, the refrigeration required for the crystallization of the Glauber salt and the heat required for the subsequent solution thereof are both substantially entirely recovered. Briefly, this is accomplished by crystallizing the Glauber salt in a vacuum crystallizer serviced with a barometric condenser in which a cooling medium comprising a sludge of Glauber salt in a saturated solution of sodium chloride is employed. As heat it taken up by the sludge in the condenser, additional Glauber salt is dissolved and part of the dissolved Glauber salt is changed to anhydrous sodium sulphate. When a solution saturated with both Glauber salt and anhydrous sodium sulphate is reached, the dissolution of additional Glauber salt causes the crystallization of anhydrous sodium sulphate. In this manner, the heat given off by the crystallization of the Glauber salt in the vacuum crystallizer is taken up in the condenser by the dissolution thereof and by the crystallization of the anhydrous sodium sulphate, both the latter reactions being endothermic.

This process will be more thoroughly understood from a description of the process as it is carried out with reference to the apparatus shown in Figure 2 of the drawings.

Referring to Fig. 2, there is shown a vacuum crystallizer of the type disclosed in a copending application, Serial No. 631,792, which comprises a cylindrical shell 16 provided with suitable top and bottom enclosures 17 and 18, and including a vapor space 19 and a circulation well 20. A large diameter slow-speed impeller 21 provided adjacent and between the bottom of the well 20 and the bottom enclosure 18 causes circulation of the medium being cooled up the outside of and down through the circulation well 20. Vapors pass from the vapor space 19 and through vapor outlet 22 and vapor line 23 to a suitable barometric condenser 24. A non-condensible gas outlet 25 is preferably provided near the top of the condenser. The condensing medium is introduced through a line 26 near the top of the condenser.

This condensing medium preferably comprises a sludge of a hydrated salt in a suitable solution, so that the transition point of the system is below the crystallization temperature of the Glauber salt in the crystallizer. A sludge of Glauber salt in a saturated solution of sodium chloride fulfills these conditions and has been found satisfactory for use as the condensing medium.

To this end the Glauber salt produced in the shell 16 is removed as a sludge through an outlet 27 and passed to a suitable arrangement for removing mother liquor, as a vacuum filter 28. The filtered salt is sluiced up with end liquor in a well 29 and transferred to a storage tank or digester 30 in which additional water and sodium chloride are added to form a sludge of Glauber salt and sodium chloride in a solution saturated with both these components. The sludge going to the condenser should contain sufficient solid sodium chloride and solid Glauber salt so that the solution after passing through the condenser will still be saturated with these components. The amounts necessary to accomplish this end will vary with each system, equipment, etc., and must be determined empirically. In practice, we deem it advisable to allow a margin of safety by using a sludge which will still contain from 5–10% unconverted Glauber salt and from 4–5% undissolved sodium chloride. In this manner, a constant temperature throughout the condenser is assured.

In our arrangement, the usual hot well used with a barometric condenser is replaced by a suitable tank 31 containing agitating means for maintaining the anhydrous sodium sulphate and remaining sodium chloride and Glauber salt in suspension. A circulation well 32 and an impeller 33 serve this latter purpose.

After passing through the condenser, the condensing medium is transferred partially to the digesting tank 30 for admixture with fresh sodium chloride and Glauber salt and partially to a suitable settler 34. The sludge from the latter is sent to the refinery while the clarified liquor is sent to the Glauber salt filter sludge well 29 for sluicing the Glauber salt to the sludge digester 30.

By the use of a Glauber salt-sodium chloride sludge in accordance with these features of our invention, we have found that approximately 88.5% of the heat given up during the crystallization of the Glauber salt will be absorbed by the condensing medium without addition of any other refrigeration. The balance of the heat of crystallization of the Glauber salt may be conveniently removed by using a primary refrigerant serviced surface condenser in the barometric condenser, as described in copending application of Burke et al., Ser. No. 433,984. To this end ammonia coils 35 are employed in the top of the barometric condenser.

The heat balance obtained by the use of the Glauber salt-sodium chloride sludge as a condensing medium is dependent upon an appreciably lower transition temperature in the system, Glauber salt-anhydrous sodium sulphate-sodium chloride-water, than in the same system free of sodium chloride and containing sodium carbonate. The transition temperature between Glauber salt and anhydrous sodium sulphate, in the absence of other salts, is 32.38° C. This transition temperature in the presence of sodium carbonate and burkeite, which is the crystallization temperature in the vacuum crystallizer 16, is approximately 23° C. In the presence of sodium chloride, however, the transition temperature of the first-named system drops to approximately 17.9° C. It is thus possible to secure an amount of refrigeration equivalent to the difference between 23° C. and 17.9° C. When used in a barometric condenser servicing a vacuum crystallizer, an additional advantage is obtained, as set forth in U. S. Patent No. 1,873,329. This advantage arises from the low vapor pressure of the Glauber salt sludge, due to which it is possible to cool water to a temperature below that of the sludge.

The invention, however, is not limited to use with vacuum cooling equipment, as the temperature effects other than vapor pressure effects may equally well be accomplished with surface condensers. The sludge may, for example, be used as the cooling medium in either a double tube or Baudelot type of heat interchanger. In these latter cases, the operation will still be at the transition point between the other solid phases so long as sufficient of the higher hydrate and of the depressing component remain to maintain saturation. If there is a deficiency of the depressing component, the transition temperature, however, will gradually rise due to dilution of said component. Where a deficiency of both components exists, the temperature of the medium will not remain constant, but it will still be serviceable as a cooling or condensing medium of high heat absorbing capacity.

While we have described the invention in its preferred forms, it is to be understood that various modifications and changes may be made, all within the scope of the invention as shown in the accompanying claims.

We claim:

1. A process of cooling which comprises transferring heat from a material to be cooled to a sludge comprising an excess of salt in a solution thereof, the system having no degrees of freedom, whereby the absorption of heat by the sludge is obtained without altering the temperature of the sludge.

2. A process of cooling which comprises transferring heat from a material to be cooled to a sludge comprising an excess of salt in a solution thereof, the solid phases of said sludge system being salts and including at least two forms of different degrees of hydration of one salt, said system having no degrees of freedom, whereby the absorption of heat by the sludge is obtained without altering the temperature of the sludge.

3. A process of cooling which comprises transferring heat from a material to be cooled to a sludge comprising an excess of salt, having at least two degrees of hydration, in a solution thereof, the system having no degrees of freedom, whereby the absorption of heat by the sludge is obtained without altering the temperature of the sludge.

4. A process of cooling, which comprises subjecting the solution to be cooled to evaporative cooling while passing the vapors of such material to be cooled into direct contact with a sludge having no degrees of freedom and sufficient excess solid matter present as to maintain all phases present and absorb heat from and condense said vapors without change in temperature of the sludge.

5. A process of cooling, which includes transferring heat from the material to be cooled to a sludge consisting of a saturated solution of a salt in the presence of the solid salt at two different degrees of hydration, whereby heat is absorbed by such sludge in converting the higher hydrated salt to a lower stage of hydration without substantial alteration in temperature of the sludge.

6. A process of cooling, which includes subjecting a solution to be cooled to evaporative cooling while passing the vapors of such solution to be cooled into direct contact with a sludge consisting of a saturated solution of salt at the transition temperature between two solid phases of said salt at different degrees of hydration, whereby said vapors are condensed without altering the temperature of such sludge.

7. A process of cooling, which includes transferring heat from the material to be cooled to a sludge consisting of a saturated solution of salt in the presence of two solid phases of said salt at different degrees of hydration, the sludge containing also a constituent adapted to lower the transition temperature of such solid phases of said salt.

8. A process of cooling, which comprises subjecting a solution to be cooled to evaporative cooling while passing the vapors into direct contact with the cooling and condensing sludge, comprising a saturated solution of salt in the presence of two solid phases of said salt at different degrees of hydration, the sludge containing also an excess of a constituent adapted to lower the transition temperature of said phases of different degrees of hydration in the sludge.

9. A process of cooling, which comprises subjecting a solution to be cooled to evaporative cooling while passing the vapors into direct contact with a cooling and condensing sludge, comprising a saturated solution of a salt in the presence of two solid phases of said salt at different degrees of hydration, the sludge containing also an excess of a constituent adapted to lower the transition temperature of said solid phases in the sludge, there being present sufficient of all the solid phases so that both the vapors from the liquid to be cooled may be saturated with said solid phases and the heat absorbed without more than consuming any one of said solid phases.

10. A process of cooling, which includes transferring the heat from the medium to be cooled to a refrigerant comprising a sludge including a hydrated salt and a less hydrated salt, and in which the conversion of the hydrated salt to the less hydrated form is an endothermic reaction.

11. A process of cooling and condensing vapors, which includes passing the vapors into contact with a cooling medium comprising a sludge containing a saturated solution of a salt and two solid phases thereof at different degrees of hydration and having no degrees of freedom, the conversion of the more hydrated to the less hydrated solid phase of said salt being an endothermic reaction, sufficient of the solid materials being present as to saturate the condensate.

12. A process of cooling and condensing vapors, which comprises bringing the vapors into contact with a cooling medium comprising a sludge containing a saturated solution of salt and two solid phases of said salt at different degrees of hydration, the conversion of the more hydrated phase to the less hydrated phase being an endothermic reaction, the sludge containing also a salt which depresses the transition temperature between such relatively hydrated forms of the first-mentioned salt.

13. A process of cooling, which comprises passing a material to be cooled into heat exchanging relationship with an aqueous solution of sodium sulphate in the presence of the decahydrate and anhydrous sodium sulphate whereby heat is absorbed from said material in converting the decahydrate to the anhydrous form without substantially altering the temperature of the heat absorbing medium.

14. A process of cooling, which comprises passing a material to be cooled into heat exchanging relationship with an aqueous solution of sodium sulphate in the presence of the decahydrate and anhydrous sodium sulphate whereby heat is absorbed from said material in converting the decahydrate to the anhydrous form without substantially altering the temperature of the heat absorbing medium, the sludge containing also sodium chloride.

15. A method of cooling, which comprises transferring heat from the material to be cooled to a sludge containing sodium chloride and an excess of both hydrated and anhydrous sodium sulphate.

16. A process of cooling, which comprises transferring heat from the material to be cooled to a solution of sodium carbonate in the presence of the decahydrate and monohydrate of sodium carbonate, the heat being absorbed in converting the decahydrate to the monohydrate without substantially altering the temperature of such sludge.

17. A process of cooling, which comprises transferring heat from the material to be cooled to a solution of sodium carbonate in the presence of the decahydrate and monohydrate of sodium carbonate, the heat being absorbed in converting the decahydrate to the monohydrate without substantially altering the temperature of such sludge, the sludge containing also sodium chloride.

18. A process of cooling a solution precipitating sodium sulphate decahydrate while simultaneously converting sodium sulphate decahydrate to the anhydrous salt, which comprises introducing the solution which is to precipitate the decahydrate into an evaporating chamber, there subjecting the solution to evaporative cooling suitable for precipitating the decahydrate of sodium sulphate, passing the vapors from said chamber into condensing contact with a sludge consisting of a saturated solution of sodium sulphate in the presence of excess decahydrate and anhydrous sodium sulphate, whereby the heat is absorbed and the decahydrate converted to the anhydrous salt without varying the temperature of the cooling operation, removing the decahydrate from the evaporating chamber, separating it from the solution, and mixing the same with water to supply the sludge for said cooling operation.

19. A process of cooling a solution precipitating sodium sulphate decahydrate while simultaneously converting sodium sulphate decahydrate to the anhydrous salt, which comprises introducing the solution which is to precipitate the decahydrate into an evaporating chamber, there subjecting the solution to evaporative cooling suitable for precipitating the decahydrate of sodium sulphate, passing the vapors from said chamber into condensing contact with a sludge consisting of a saturated solution of sodium sulphate in the presence of excess decahydrate and anhydrous sodium sulphate and of sodium chloride, whereby the heat is absorbed and the decahydrate converted to the anhydrous salt without varying the temperature of the cooling operation, removing the decahydrate from the evaporating chamber, separating it from the solution, mixing the same with water to supply the sludge for said cooling operation, and adding sodium chloride to the sludge used in the cooling operation.

20. A process of maintaining a substantially constant pressure below atmospheric upon evaporative cooling chamber, which comprises passing the vapors from said evaporative cooling chamber into a barometric condenser, servicing said barometric condenser with a sludge of salt having no degrees of freedom and containing sufficient excess salt to keep saturating the condensate whereby the temperature and vapor pressure in the barometric condenser is maintained constant throughout the operations of absorbing heat from and condensing the vapors.

21. The process of producing a salt of low degree of hydration from a solution containing said salt, which comprises causing crystallization of a higher hydrate of said salt by transferring heat from said solution to an aqueous sludge containing an excess of said higher hydrate and a substance capable of depressing the transition point of said higher hydrate to a lower hydrate, the absorption of heat by said sludge causing the conversion of said higher hydrate to a lower hydrate, and recovering the lower hydrate so produced.

22. The process of producing a hydrated salt from a solution containing said salt, which comprises introducing said solution into an evaporative cooler, creating a vacuum in said cooler to cause crystallization of a higher hydrate of said salt through cooling by removal of heat of vaporization, passing the vapors from said cooler into contact with an aqueous sludge of an excess of said higher hydrate and of a substance capable of depressing the transition point of said higher hydrate to a lower hydrated form, the absorption of heat by said sludge causing the conversion of said higher hydrate to a lower hydrated form, and recovering the higher hydrated form so produced.

23. The process of producing anhydrous sodium sulphate from a solution containing sodium sulphate, which comprises transferring heat from said solution to a sludge containing an excess of sodium sulphate decahydrate and sodium chloride to cause crystallization of sodium sulphate decahydrate from said solution and anhydrous sodium sulphate from said sludge, recovering the anhydrous sodium sulphate, and employing said decahydrate for the formation of the cooling sludge.

24. The process of producing anhydrous sodium sulphate from a solution containing sodium sulphate, which comprises introducing said solution into an evaporative cooler, applying a vacuum to said cooler to cause cooling of said solution through removal of heat of evaporation therefrom and thereby causing crystallization of sodium sulphate decahydrate, passing the vapors so produced to a barometric condenser, and bringing the same into contact therein with a cooling medium comprising a sludge containing an excess of sodium sulphate decahydrate and sodium chloride, the absorption of heat by said medium causing the precipitation of anhydrous sodium sulphate therefrom, and recovering the latter, and employing the crystallized sodium sulphate for the production of said sludge.

25. The process of producing a salt of lower degree of hydration from a salt of a higher degree of hydration, which comprises producing a sludge comprising an excess of said salt of the higher degree of hydration and employing said sludge as a condensing medium, the amount of said higher hydrate in said sludge being greater than will pass into solution in the solvent at the temperature of condensation, the transference of heat to said sludge causing deposition of a lower hydrate of said salt.

26. The process of converting sodium sulphate decahydrate to anhydrous sodium sulphate, which comprises producing a sludge comprising solid sodium sulphate decahydrate in an aqueous solvent and bringing said sludge into contact with a medium to be cooled, the amount of solid sodium sulphate decahydrate present in said sludge being sufficient to cause the deposition of anhydrous sodium sulphate upon the absorption of heat from the medium to be cooled, said deposition being a result of the conversion of sodium sulphate decahydrate to anhydrous sodium sulphate by the heat absorbed.

27. The process of converting sodium sulphate decahydrate to anhydrous sodium sulphate, which comprises producing a sludge comprising solid sodium sulphate decahydrate and a component capable of depressing the transition point between sodium sulphate decahydrate and anhydrous sodium sulphate in an aqueous solvent and bringing said sludge into contact with a medium to be cooled, the amount of solid sodium sulphate decahydrate present in said sludge being sufficient to cause the deposition of anhydrous sodium sulphate upon the absorption of heat from the medium to be cooled, said deposition being a result of the conversion of sodium sulphate decahydrate to anhydrous sodium sulphate by the heat absorbed.

28. The process of producing a salt of low degree of hydration from a solution containing said salt which comprises causing crystallization of a higher hydrate of said salt by transferring heat from said solution to an aqueous sludge containing an excess of said higher hydrate and a substance capable of depressing the transition point of said higher hydrate to a lower hydrate, the absorption of heat by said sludge causing the conversion of said higher hydrate to said lower hydrate, recovering said higher hydrate so produced, and employing same in the formation of said aqueous sludge, supplying additional refrigeration to compensate for the difference in the heat required for crystallization of the salt of higher hydration and the heat absorption capacity of said sludge to thereby form a balanced heat cycle, and recovering the lower hydrate so produced.

29. The process of producing anhydrous sodium sulphate from a solution containing sodium sulphate, which comprises introducing said solution into an evaporative cooler, supplying a vacuum to said cooler to cause crystallization of sodium sulphate decahydrate through cooling by removal of heat of evaporation, passing the vapors from said cooler into contact with an aqueous sludge of an excess of sodium sulphate decahydrate, and sodium chloride, the absorption of heat by said sludge causing the conversion of sodium sulphate decahydrate to anhydrous sodium sulphate, employing the sodium sulphate decahydrate so produced for the formation of said sludge, supplying additional refrigeration to balance the difference in the heat absorbing capacity of said sludge and the heat required for crystallization of the sodium sulphate decahydrate and recovering the anhydrous sodium sulphate.

LEROY G. BLACK.
MORTIMER M. RICH.